United States Patent [19]
Barthelemy

[11] Patent Number: 5,095,070
[45] Date of Patent: Mar. 10, 1992

[54] POLYAMIDE-IMIDE SOLUTIONS AND THE PROCESS FOR OBTAINING THEM

[75] Inventor: Pascal Barthelemy, Lyons, France

[73] Assignee: Rhone Poulenc Fibres, Lyons, France

[21] Appl. No.: 703,045

[22] Filed: May 17, 1991

Related U.S. Application Data

[63] Continuation of Ser. No. 408,525, Sep. 18, 1989, abandoned.

[30] Foreign Application Priority Data

Sep. 21, 1988 [FR] France .................. 88 12559

[51] Int. Cl.$^5$ ............................................ C08G 18/34
[52] U.S. Cl. ...................................... 524/714; 524/871; 524/873; 528/71
[58] Field of Search .................. 524/714, 871, 873; 528/71

[56] References Cited

U.S. PATENT DOCUMENTS

| | | | |
|---|---|---|---|
| 3,505,272 | 4/1970 | Gagliani | 524/871 |
| 3,673,160 | 6/1972 | Buisson et al. | 528/71 |
| 3,843,587 | 10/1974 | Keating et al. | 524/871 |
| 4,389,521 | 6/1943 | Shimada et al. | 524/714 |
| 4,736,008 | 4/1988 | Kouno et al. | 528/57 |
| 4,795,795 | 1/1989 | Kouno et al. | 528/53 |

Primary Examiner—John Kight, III
Assistant Examiner—Rabon Sergent
Attorney, Agent, or Firm—Stevens, Davis, Miller & Mosher

[57] ABSTRACT

The present invention relates to spinnable and mouldable polyamide-imide solutions as well as the process for their preparation.

They contain 4 to 35% of a polyamide-imide having a polydispersity index $\leq 2.1$ in a solvent mixture containing 45–100% by weight of DMEU and 0–55% of an aprotic polar solvent. They are obtained by the reaction, in dimethylethyleneurea of pH $\leq 7$ as polycondensation solvent, of a diisocyanate, an aromatic acid anhydride, optionally an alkali or alkaline earth dicarboxybenzene sulphonate and optionally another aromatic dicarboxylic acid, the polyamide-imide concentration therefore being from 4 to 35%, then by dilution in a polar solvent at a temperature of between 120° and 200° C.

The solutions thus obtained are limpid at ambient temperature, capable of being stored and have an improved color.

21 Claims, No Drawings

POLYAMIDE-IMIDE SOLUTIONS AND THE PROCESS FOR OBTAINING THEM

This application is a continuation of application Ser. No. 408,525, filed Sept. 18, 1989, now abandoned.

The present invention relates to directly spinnable and mouldable polyamide-imide solutions in a solvent mixture.

It also relates to a process for obtaining solutions having an improved colour.

It is already known from FR 2,079,785 to prepare solutions based on polyamide-imides in N-methylpyrrolidone, but the solutions and polymers thus obtained have an intensely brown colour which limits the possibilities of later coloration of the articles formed from the solutions.

It is also known from European Patent Application 0.194,058 to prepare polyamides and/or polyamide-imides with little colour by virtue of joint use of a catalyst of the carbonate, hydrogen carbonate, hydroxide or polycarboxylic acid salt of an alkali metal type, and of a solvent of the N,N'-dimethylethyleneurea type.

It has now been found that it is possible to obtain solutions of certain polyamide-imides (PAI) with little colour, in less costly conditions than those advocated in European Patent Application 0,194,058, without requiring the use of a catalyst during the polycondensation phase.

The present invention relates to directly spinnable and mouldable limpid solutions of PAI containing:

(a) 4 to 35% by weight of a PAI comprising
   recurring amide-imide residues (A) of formula:

$$-NH-R-N\diagup_{CO}^{CO}\diagdown R_1-CO-$$

optionally recurring amide residues (B) of formula $$-NH-R-NH-CO-\underset{SO_3H}{\bigcirc}-CO-$$

optionally amide residues (C) of formula: $-NH-R-NH-CO-R_2-CO-$ in which:
   R = divalent organic group
   $R_1$ = trivalent aromatic radical
   $R_2$ = divalent armoatic radical
   M = alkali or alkaline earth metal,
   and having a polydispersity index I less than or equal to 2.1, in (b) a solvent mixture comprising:
   45 to 100% by weight of dimethylethyleneurea of $ph \leq 7$
   0 to 55% by weight of an anhydrous aprotic polar solvent of high boiling point.

They have, in addition, a colour which is quantified by measurement of the absorbance, at a 500 nm waveh and using a Philips PU 8600 spectrophotometer of a 21% solution of polymer diluted 10 times; between 0.010 and 0.060, preferably between 0.010 and 0.040.

The present invention also relates to a sequenced process for obtaining limpid, directly spinnable and mouldable solutions based on polyamide-imide, comprising the polycondensation reaction carried out in DMEU of $pH \leq 7$, the concentration of the polymer before dilution then being between 10 and 40%, then dilution, carried out at a temperature of between 120 and 200° C. in an anhydrous aprotic polar solvent of high boiling point, the final concentration in the solvent mixture being between 4 and 35%.

The solutions according to the present invention are prepared by the reaction, in DMEU of pH23 7, of:
   at least one diisocyanate of formula OCN—R—NCO
      in which R is a divalent organic group.
   an aromatic acid anhydride
   an alkali or alkaline earth 3,5-dicarboxybenzene sulphonate, in proportions such that the molar ratio diisocyanate all acid reagents is approximately equal to 1,
   an aromatic dicarboxylic acid.

Among the diisocyanates which can be used the aromatic diisocyanates, the tolylene diisocyanates, preferably symmetrical ones such as 4,4,-diphenymethane diisocyanate, 4,4,-diphenylether diisccvanate or aliphatic diisocyanates such as 1,6-hexamethylene diisocyanate or bis-cyclohexyl diisccyanate may be mentioned.

It is also possible to use several of the diisocyanates mentioned above. But preferably 4,4'-diphenylmethane diisocyanate and 4,4'-diphenylether diisocyanate are used.

Benzene-1,2,4-tricarboxylic acid anhydride is preferably used as the aromatic acid anhydride.

Sodium or potassium sulphonate is preferably used as the alkali metal or alkaline earth metal 3,5-dicarboxybenzene sulphonate.

Among the aromatic dicarboxylic acids, terephthalic and isophthalic acids are generally used, although terephthalic acid is preferred.

The different acid or acid anhydride compounds are present in the following molar proportions:
   aromatic acid anhyride from 82 to 94% with respect to the whole of the acid reagents, preferably 85 to 94%.
   aromatic dicarboxylic acid from 0 to 20%, preferably from 5 to 15%.
   dicarboxvbenzene sulphonate in the proportion of 1 to 3% with respect to the whole of the acid reagents.

The polycondensation reaction takes place at high temperature (generally between 170° and 200° C.) in DMEU of $pH \leq 7$.

At the end of the polycondensation reaction the concentration of the polymer is between 10 and 40%, preferably between 12 and 38%, and dilution with an anhydrous aprotic polar solvent is carried out such that the final concentration of polyamide-imide is between 4 and 35%, preferably between 5 and 35%.

It is important, in the conditions of the invention, that the DMEU has a $pH \leq 7$; in the opposite situation the polycondensation reaction cannot take place.

Dilution is carried out at a temperature of between 120° and 200° C., preferably between 145° and 190° C., but the two operations must be carried out in a sequenced manner, otherwise the solutions according to the invention cannot be obtained: either the polymer precipitates and does not redissolve, or the viscosity is not high enough.

Among the dilution solvents N-methylpyrrolidone (NMP), dimethylacetamide (DMAC), dimethylformamide (DMF), tetramethylurea (TMU) and γ-butyrolactone (γBL) are particularly suitable, although DMEU can also be used. The polycondensation reaction is carried out only in DMEU, the dilution solvent serving only for the second phase of the preparation of the solutions. However DMEU can also be used as dilution solvent, but is not preferred, for economic reasons since it is an expensive solvent, and for practical reasons since the solutions obtained have very high viscosities which require complementary dilution.

If the order of introduction of the solvents is reversed, except in the case of DMEU, or if the two solvents for the polycondensation phase are used simultaneously, either polycondensation does not take place, or precipitates are produced, or even the viscosity is not high enough.

In addition, it is important that the DMEU has a slightly acid pH; in the opposite situation the polycondensation reaction cannot take place.

The use of a dilution solvent such as those mentioned above together with the use of DMEU to obtain very slightly coloured solutions of PAI constitutes an effect which is completely unexpected, since according to European Patent Application 0,194,058 this colour problem is linked to the presence of solvents of the amide type.

In addition, still refering to European Patent Application 0,194,058 and in particular to the examples, it is entirely surprising that, with DMEU as polycondensation solvent and in the absence of any catalyst, it has been possible to obtain polyamide-imides of sufficiently high viscosity.

The solutions thus obtained are limpid, only slightly coloured and allow a colour which is quantified by measurement of the absorbance, at a 500 nm wavelength and using a Philips PU 8600 spectrophotcmeter of a 21% solution of polymer diluted 10 times, which is between 0.010 and 0.060, preferably between 0.010 and 0.040.

The viscosity of the solutions obtained according to the invention can vary widely. It is measured on a 21% Rhéomat 15 type—Tube D+E.

In particular, the solutions obtained with DMEU used both as a preparation solvent and as a dilution solvent have very high viscosities, and it is necessary to add additional solvent in order to form them later on.

The solutions according to the invention are mouldable and in particular spinnable by known processes of dry or wet spinning. They can be obtained discontinuously or continuously using any appropriate apparatus.

They have the advantage of a lower cost when the dilution solvent is not DMEU, and this without, for all that, causing technical problems to appear.

In addition, the process for obtaining solutions according to the invention is flexible, which allows their viscosity to be varied for a polymer of identical masses In the examples which follow, the values of $\overline{Mn}$ and $\overline{Mw}$ are determined by gel permeation chromatography (GPC) in NMP at 80° C. and 0.1 mole/litre of lithium bromide, the masses being expressed with respect to a polystyrene standard.

The polydispersity index I corresponds to the ratio $\overline{Mw}/\overline{Mn}$. It is seen from examples that this is low, which corresponds to a tight distribution of the molecular masses which has surprising consequences for the physical and thermal properties of the products obtained, in particular less thermal degradation of the polymer is observed (measured at 375° C. on precipitated polymer) from the degradation kinetics, that is to say the loss of weight, represented by V in %min$^{-1}$, and less photodegradation (of film) by measurement of the percentages of breaking energy lost before and after exposure to the Xenotest.

The examples below illustrate the present invention without limiting it.

EXAMPLE 1

Apparatus: 1.5 l glass reactor, equipped with a stainless steel stirrer of the anchcr type, a 250 ml dropping funnel intended for the addition of the dilution solvent, a nitrogen delivery system with a bubble-counter, rotation speed 85 rev/min, a thermometer probe and a reflux condenser with a bubble-counter outlet. The outlet of the condenser is linked to a column loaded with 600 g of soda-lime intended to trap the carbon dioxide gas which evolves during the polycondensation reaction. A balance placed near the installation allows the increase in weight of the column loaded with soda-lime (direct access to the weight of $CO_2$ evolved) to be registered. Heating of the reactor is carried out by a bath of silicone oil guided by a regulation system using a program control device for the increase in temperature, and optionally for temperature maintenance at a given temperature (in the majority of cases 198° C.).

In all the experiments the following "slope" of temperature increase was adopted:

```
increase from  18 to  98° C. in 30 min,
increase from  98 to 185° C. in 70 min,
increase from 185 to 198° C. in 20 min,
maintenance at 198° C. for 5 to 30 min.
```

| | |
|---|---|
| Benzene-1,2,4-tricarboxylic acid anhydride (ANTM) | 51.6 g (0.2688 mole) |
| Terephthalic acid (AT) | 8.9 g (0.0537 mole) |
| Sodium salt of 5-sulphoisophthalic acid (AISNa) | 3.59 g (0.0134 mole) |
| Diphenylmethane 4,4'-diisocyanate (MDI) | 84 g (0.336 mole) |
| Dimethylethyleneurea (DMEU) of pH ≦ 7 | |
| polycondensation | 322 g (d = 1.055)  305 ml |
| dilution | 124 g (d = 1.055)  117.5 ml |

Molar ratio of reagents : Stoichiometry between the acid + carboxylic anhydride functions and the isocyanate functions.

Method : Having pruged the apparatus with a current of nitrogen for 1 hour, about ⅔ of the DMEU intended for the polycondensation reaction is loaded into the apparatus under a slight countercurrent of nitrogen, the stirrer is started and then the ANTM, the AT, the AISNa, the MDI and the rest of the DMEU are introduced successively. Heating of the reaction mass is immediately started, applying the temperature increase "slope" described in paragraph 1.

During this operation the following observations were made:
  dissolution of the reagents is total at 98° C.
  evolution of $CO_2$ begins at about 110° C., reaches its maximum at about 170° C. and finishes at 198° C..
  slight exothermy at about 170° C.

reaction is total with an veolution of 0.672 moles of $CO_2$.

The reaction is continued at a constant temperature of 198° C. for 45 min. At this stage, the reaction mass, the concentration of dry matter of which is 26.90% by weight, is very viscous. The oil bath is removed, and the dilution DMEU is added over 15 min, the temperature of the mass falls from 198° C. to 136° C., and the concentration of dry matter from 26.9 to 21% by weight.

The operation is abandoned and the stirring stopped, under a light overpressure of nitrogen. When the temperature of the mass has come down to about 50° C. the reactor is disassembled and the solution stored in a 1 l glass container.

Characterization:

| Viscosity: |
| --- |
| Epprecht Rheomat 15 viscosimeter, tube D + E |
| Absolute viscosity at 25° C.: |
| 6030 poises |

| Molecular masses: | | | |
| --- | --- | --- | --- |
| Mn | Mw | Mz | polydispersity |
| 50050 | 104640 | 175560 | 2.09 |
| Colour: absorbance at λ = 500 nm: 0.018 | | | |

EXAMPLE 2

A polyamide-imide is prepared from the same monomers as those used in Example 1, and according to an identical process, but using as solvent:

| for polycondensation: DMEU | 223 g | 211 ml |
| --- | --- | --- |
| for dilution: γ-butyrolactone (γBL) | 223 g | 197 ml |

The PAI is soluble in the solvent mixture at ambient temperature.

| Molecular masses of the polyamide: |
| --- |
| $\overline{Mn}$ = 48280 - $\overline{Mw}$ = 93020 - polydispersion index I = 1.93. |

The characteristics of the solutions are collated in Table 1 below.

EXAMPLE 3

A polyamide-imide of the same chemical nature as that in Example 1 is prepared according to an identical process, but using as solvent:

| for polycondensation: DMEU | 223 g | 211 ml |
| --- | --- | --- |
| for dilution: dimethylacetamide (DMAC) | 223 g | 237 ml |

The temperature of the reaction mass being lowered to 160° C. before dilution. The PAI obtained is soluble in the solvent mixture.

Molecular masses of the PAI: $\overline{Mn}=41660-\overline{Mw}=83720-I=2.01$
The solution obtained is limpid and stable over time at 20° C. It characteristics are recorded in Table 1 below.

EXAMPLE 4

A polymer of the same chemical nature is prepared according to the same process as that indicated in Example 1, with the exception of the solvent mixture:

| polycondensation DMEU | 223 g | 211 ml |
| --- | --- | --- |
| dilution tetramethylurea (TMU) | 223 g | 230 ml |

The temperature of the reaction mass is lowered to 170° C. before addition of the TMU.

The polymer solution is limpid at 20° C.
Characteristics of the polymer:
$\overline{Mn}=46180-\overline{Mw}=92229-I=2.00$ The characteristics of the solution are indicated in Table 1 below.

EXAMPLE 5

A polymer identical to that in Example 1 is prepared according to the same process, but using the following solvent mixture:

| polycondensation DMEU | 223 g | 211 ml |
| --- | --- | --- |
| dilution dimethylformamide (DMF) | 223 g | 237 ml |

Before addition of the DMF, the temperature of the reaction mass is lowered to 20° C.

The solution is limpid at 20° C., and the polymer has the following characteristics:
Molecular masses:
$\overline{Mm}=45300-\overline{Mw}=87370-I=1.93$ The characteristics of the solutions are given in Table 1 below.

COMPARATIVE EXAMPLE 5

A polyamide-imide solution is prepared from the same monomers as those described in Example 1, but using 2-N-methylpyrrolidone (NMP) as solvent for polycondensation and dilution.

Molecular masses of the polymer:
$M',ovs/n/=28700-\overline{Mw}=81700-I=1.80$

TABLE 1

| Ex. | Reaction/ dilution solvent | Weight Ratio % | Colour | Viscosity 25° C.-21% |
| --- | --- | --- | --- | --- |
| 1 | DMEU/DMEU | 72:28 | 0.018 | 6030 |
| 2 | DMEU/γBL | 50:50 | 0.018 | 779 |
| 3 | DMEU/DMAC | 50:50 | 0.013 | 447 |
| 4 | DMEU/TMU | 50:50 | 0.010 | 455 |
| 5 | DMEU/DMF | 50:50 | 0.032 | 349 |
| 5C | NMP/NMP | 72:28 | 0.505 | 800 |

EXAMPLE 6

The apparatus used is that described in Example 1.
Reagents:

| Benzene-1,2,4-tricarboxylic acid anhydride (ANTM) | 61.44 g (0.32 mole) |
| --- | --- |
| Terephthalic acid (AT) | 10.62 g (0.064 mole) |
| Sodium salt of 5-sulphoisophthalic acid (AISNa) | 4.29 g (0.016 mole) |
| Diphenylether 4,4'-diisocyanate (DIDE) | 100.80 g (0.4 mole) |
| Dimethylethyleneurea (DMEU) ph ≦ 7 | |
| polycondensation | 391.5 g (d = 1.055) 371 mole |

| | | |
|---|---|---|
| dilution | 153 g (d = 1.055) | |
| | 145 mole | |

Molar ratio of the reagents: Stoichiometry between the acid + carboxylic anhydride functions and the isocyanate functions.

Method:

Having purged the apparatus with its nitrogen current for 1 hour, about ⅓ of the DMEU intended for the polycondensation reaction is loaded into the apparatus, the stirrer is started and then the ANTM, the AT, the AISNa, the DIDE and the rest of DMEU are successively introduced. Heating of the reaction mass is started immediately, applying the temperature increase "slope" described in Example 1.

During this operation the following observations are made:

- dissolution of the reagents is total at about 80°-85° C.
- evolution of $CO_2$ begins at about 110° C., reaches its maximum at about 160°-170° C. and finishes at 198° C.
- slight exothermy during the level portion of the curve at 198° C.
- the reaction is total with an evolution of 0.8 mole of $CO_2$.

The reaction is continued at constant temperature of 190° C. for 20 min. At this stage, the reaction mass, the concentration of dry matter in which is 26.61% by weight, is very viscous. The oil bath is removed, and the diluation DMEU is added over 17 min, the temperature of the mass falls from 198° to 135° C. and the concentration of dry matter from 26.61 to 20.68% by weight.

The operation is abandoned, and the stirring stopped, under a light overpressure of nitrogen. When the temperature of the mass has descended to about 50° C. the reactor is disassembled and the solution is stored in a 1 l glass container.

Characterization:

| Viscosity: |
|---|
| Epprecht Rheomat 15 viscosimeter, tube D + E. |
| Absolute viscosity at 25° C.: |
| 3342 poises |

| | Molecular masses: | |
|---|---|---|
| $\overline{Mn}$ | $\overline{Mw}$ | Polydispersity (I) |
| 49120 | 82020 | 1.67 |

Colour: This is determined on 10-times diluted collodion by measuring the absorbance at 25° C. and λ = 500 nm on a Philips PU 8600 spectrophotometer: absorbance at λ = 500 nm: 0.030

EXAMPLE 7

A PAI of identical chemical structure to that in Example 6 is prepared, but using as solvent mixture:

| polycondensation solvent DMEU | 326.7 g | 309 ml |
|---|---|---|
| dilution solvent: γ-butyrolactone (γBL) | 217.8 g | 193 ml |

The solution is limpid and stable at 20° C.
Molecular masses of the PAI:
$\overline{Mn} = 28250 - M',ovw/w/ = 53580 - I = 1.90$ The characteristics of the solution are indicated in Table 2 below.

EXAMPLE 8

This is carried out in the same way as indicated in Example 6, to obtain a PAI of the same type, with the following solvents:

| polycondensation solvent | 326.7 g | 309 ml |
|---|---|---|
| dilution solvent: dimethylacetamide (DMAC) | 217.8 g | 232 ml |

Before addition of the DMAC, the temperature of the reaction mass is reduced to 160° C.

The solution is limpid at 20° C.

Molecular masses of the polymer:
$\overline{Mn} = 48850 - M',ovw/w/ = 100960 - I = 2.07$ The characteristics of the solution are indicated in Table 2 below.

EXAMPLE 9

The operation is carried out in the manner indicated in Example 6, but using the following solvent mixture:

| polycondensation: DMEU | 326.7 g | 309 ml |
|---|---|---|
| dilution: tetramethyl urea (TMU) | 217.8 g | 224 ml |

Before addition of the TMU the temperatur eof the reaction mass is reduced to 170° C. The solution is limpid at 20° C.

Molecular masses of the polymer:
$\overline{Mn} = 62240 - M',ovw/w/ = 119280 - I = 1.92$ The characteristics of the solution are given in Table 2 below.

EXAMPLE 10

The operation is carried out as in Example 6, but using the following solvent mixture:

| polycondensation: DMEU | 391.5 g | 371 ml |
|---|---|---|
| dilution: dimethylformamide (DMF) | 153 g | 163 ml |

Before addition of the DMF, the temperature of the reaction mass is lowered to 150° C.

Molecular mass of the polymer:
$\overline{Mn} = 42720 - M',ovw/w/ = 73840 - I = 1.73$ The characteristics of the solutions are given in Table 2 below.

TABLE 2

| Ex. | Reaction/ Dilution solvent | Weight Ratio % | Colour | Viscosity 25° C.-21% |
|---|---|---|---|---|
| 6 | DMEU/DMEU | 72:28 | 0.030 | 3342 |
| 7 | DMEU/γBL | 60:40 | 0.045 | 643 |
| 8 | DMEU/DMAC | 60:40 | 0.047 | 2771 |
| 9 | DMEU/TMU | 60:40 | 0.048 | 3290 |
| 10 | DMEU/DMF | 72:28 | 0.054 | 405 |

EXAMPLE 11

Apparatus: An apparatus which is comparable to that described in Example 1, but has a capacity equal to 100 ml, is used.

Reagents:

| | |
|---|---|
| benzene-1,2,4-tricarboxylic acid anhydride (ANTM) | 2.58 g (0.01344 mole) |
| terephthalic acid (AT) | 0.445 g (0.00268 mole) |
| AISNa | 0.1795 g (0.00067 mole) |
| tolylene diisocyanate (TDI) | 2.92 g (0.0168 mole) (d = 1.225) about 2.4 ml |
| DMEU (polycondensation) | 12.56 g (d = 1.055) that is about 11.9 ml |
| DMEU (dilution) | 4.92 g (d = 1.055) that is about 4.65 ml |

Ratio of the polycondensation/dilution solvents: 72:28.

Method:

The ANTM, AT, AISNa, 1 piece of pumice stone, the DMEU and the TDI are loaded under nitrogen. The reactor is plunged into the oil bath and the mass is stirred (increased to 198° C. in 10 min, dissolution of reagents at about 100° C.). The condenser and the overpressure of nitrogen are put in place. The mixture is left to react at 198° C. for 2 h 15 min, the dilution DMEU is added, the solution is homogenized (only slightly viscous) and stored in a 60 ml container.

Characterization:
Molecular masses:

| Molecular masses: | | | |
|---|---|---|---|
| $\overline{Mn}$ | $\overline{Mw}$ | $\overline{Mz}$ | Polydispersity |
| 27460 | 53660 | 80250 | 1.95 |

EXAMPLE 12

Apparatus: The apparatus described in Example 11 is used.

Reagents:

| | |
|---|---|
| ANTM | 2.58 g (0.01344 mole) |
| AT | 0.445 g (0.00268 mole) |
| AISNa | 0.1795 g (0.00067 mole) |
| Hexamethylene diisocyanate (HDI) | 2.892 g (0.0168 mole) (d = 1.04) about 2.7 ml |
| DMEU (polycondensation) | 12.29 g (d = 1.055) that is about 11.65 ml |
| DMEU (dilution) | 4.31 g (d = 1.056) that is about 4.55 ml |

Method:

The ANTM, AT, AISNa, the DMEU and the HDI are loaded. The reactor is plunged into the oil bath and the mass is stirred (increase to 180° C. in 10 min, total dissolution of reagents at about 100° C.). The condenser and the nitrogen overpressure are put in place. The mixture is left ot react at 198° C. for 8 h 25 min (no increase in viscosity), the dilution DMEU is added, the mixture is homogenized and stored in a 60 ml container.

Characterization:
Molecular masses:

| Molecular masses: | | | |
|---|---|---|---|
| $\overline{Mn}$ | $\overline{Mw}$ | $\overline{Mz}$ | Polydispersity |
| 9960 | 19870 | 34080 | 1.99 |

COMPARATIVE EXAMPLE 13

An experiment is carried out with the DMEU at pH>7, using the reagents indicated in Example 6 in the same proportions.

Precipitation is observed to start after 70 min of reaction/temperature (reaction mass 158° C.).

At 175° C., the precipitate has not disappeared. The dilution DMEU is poured in but no redissolution is observed.

Such a solvent is therefore not usable for the preparation of solutions according to the invention.

I claim:

1. A directly spinnable and moldable limpid solution having no catalyst residue, characterized by the fact that it contains:

(a) 4 to 35% by weight of a polyamide-imde comprising recurring amide-imide residues (A) of formula:

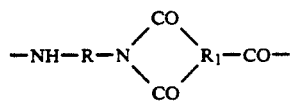

recurring amide residues (B) of formula:

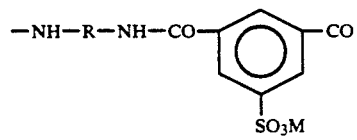

amide residues (C) of formula:

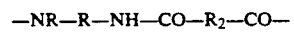

$$-NR-R-NH-CO-R_2-CO-$$

in which:

R = a divalent organic group
$R_1$ = a trivalent aromatic radical
$R_2$ = a divalent armoatic radical
M = an alkali or alkaline earth metal, the A units representing 82 to 94% of the whole of the units, the B units representing 1 to 3% of the whole of the units, the C units repsresenting 5 to 15% of the whole of the units, and having a polydispersity index I<2.1, (b) a solvent mixture comprising:
45–100% by weight of dimethylethyleneurea of pH less than or equal to 7,
0–55% by weight of an anhydrous aprotic polar solvent of high boiling point, said polyamide-imide having been neither precipitated, nor separated, washed and dried before dissolution in said solvent mixture.

2. A solution according to claim 1, characterized in that it has a color, quantitified by measurement of the absorbance at a wavelength of 500 nm of a 21% solution of polymer diluted 10 times, by means of a Philips PU 8600 spectrophotometer, of between 0.010 and 0.060.

3. A solution according to claim 1, characterized in that the solvent mixture contains 50 to 80% of dimethylethyleneurea and 20 to 50% of an aprotic polar solvent of high boiling point.

4. A solution according to claim 1, characterized in that the concentration of polyamide-imide in the mixture is between 5 and 35%.

5. A solution according to claim 1, characterized in that the aprotic polar solvent is N-methylpyrrolidone, dimethylacetamide, dimethylformamide, tetramethylurea or δ-butyrolactone.

6. A solution according to claim 1, characterized in that, in the A, B and C units, R is an aromatic or alphatic radical.

7. A solution according to claim 1, characterized in that R is a radical of formula:

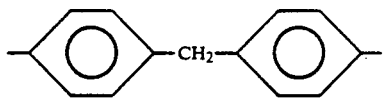

8. A solution according to claim 1, characterized in that R is a radical of formula:

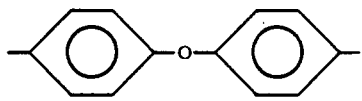

9. A solution according to claim 1, characterized in that the A amide-imide units contain a radical $R_1$ of formula:

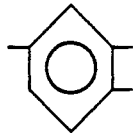

10. A solution according to claim 1, characterized in that the B amide units contain a radical $R_2$ of formula:

11. A solution according to claim 1, characterized in that the B imide units contain an $SO_3M$ group in which M is an alkali metal.

12. Process for obtaining a directly spinnable and moldable solution for a polyamide-imide, characterized in that:
polycondensation is carried out without a catlayst between at least
  a a dissocyanate of formula OCN—R—NCO in which R is a divalent organic group
  b an aromatic acid anhdride
  c an alkali or alkaline earth 3,5-dicarboxy-benzene sulphonate
  d an aromatic dicarboxylic acid in proportions such that the molar ratio $$\frac{a}{b+c+d}$$

is approximately equal to 1, and that the acid anhydride is present in a quantity of 82 to 94 moles %, the benzene sulphonate in a quantity of 1 to 3%, and the aromatic acid in a quantity of 5 to 15 moles % with respect to the whole of the acid reagents, in dimethylethyleneurea of $pH \leq 7$ as polycondensation solvent, the polymer concentration before dilution being between 10 and 40%, then
dilution is then carried out at a temperature of between 120° and 200° C. in an aprotic polar solvent of high boiling point such that the final concentration of polyamide-imide in the solvent mixture is betwene 4 and 35%, and that the weight ratio reaction solvent/dilution solvent is between 45:55 and 100:0.

13. Process according to claim 12, characterized in that the weight ratio reaction solvent/dilution solvent is between 50:50 and 80:20.

14. Process according to claim 12, characterized in that before dilution the concentration of the polymer is between 12 and 38%.

15. Process according to claim 12, characterized in that after dilution the concentration of the polymer is between 5 and 35%.

16. Process according to claim 12, characterized in that dilution is carried out at a temperature of between 145° and 190° C.

17. Process according to claim 12, characterized in that the diisocyanate used is an aromatic or aliphatic diisocyanate.

18. Process according to claim 12, characterized in that the diisocyanate used is 4,4'-diphenylmethane diisocyanate or 4,4'-diphenylether diisocyanate.

19. Process according to claim 12, characterized in that the aromatic acid anhydride is benzene-1,2,4-tricarboxyilc acid anhydride.

20. Process according to claim 12, characterized in that the aromatic acid is terephthalic acid.

21. Process according to claim 12, characterized in that the benzene sulphonate is the sodium or potassium salt.

* * * * *